United States Patent
Chipley

(10) Patent No.: US 12,538,940 B2
(45) Date of Patent: *Feb. 3, 2026

(54) TOBACCO HAVING REDUCED TOBACCO SPECIFIC NITROSAMINE CONTENT

(71) Applicant: U.S. Smokeless Tobacco Company LLC, Richmond, VA (US)

(72) Inventor: John R. Chipley, Brentwood, TN (US)

(73) Assignee: U.S. Smokeless Tobacco Company LLC, Richmond, VA (US)

( * ) Notice: Subject to any disclaimer, the term of this patent is extended or adjusted under 35 U.S.C. 154(b) by 663 days.

This patent is subject to a terminal disclaimer.

(21) Appl. No.: 18/078,331

(22) Filed: Dec. 9, 2022

(65) Prior Publication Data

US 2023/0107024 A1    Apr. 6, 2023

Related U.S. Application Data

(63) Continuation of application No. 16/441,717, filed on Jun. 14, 2019, now Pat. No. 11,547,138, which is a continuation of application No. 15/006,205, filed on Jan. 26, 2016, now Pat. No. 10,357,055, which is a continuation of application No. 13/442,280, filed on Apr. 9, 2012, now Pat. No. 9,271,524, which is a continuation of application No. 11/852,172, filed on Sep. 7, 2007, now abandoned.

(51) Int. Cl.
*A24B 15/28* (2006.01)
*A24B 13/00* (2006.01)
*A24B 15/18* (2006.01)

(52) U.S. Cl.
CPC ............ *A24B 15/287* (2013.01); *A24B 13/00* (2013.01); *A24B 15/183* (2013.01)

(58) Field of Classification Search
None
See application file for complete search history.

(56) References Cited

U.S. PATENT DOCUMENTS

| | | |
|---|---|---|
| 158,015 A | 12/1874 | Barton |
| 2,094,614 A | 10/1937 | Miller |
| 2,626,612 A | 1/1953 | Pearce |
| 3,474,792 A | 10/1969 | Miller et al. |
| 4,127,136 A | 11/1978 | Comber |
| 4,343,318 A | 8/1982 | Brenik et al. |
| 4,516,590 A | 5/1985 | Teng |
| 4,528,993 A | 7/1985 | Sensabaugh et al. |
| 4,660,577 A | 4/1987 | Sensabaugh et al. |
| 4,730,628 A | 3/1988 | Townsend et al. |
| 4,848,373 A | 7/1989 | Lenkey |
| 4,889,638 A | 12/1989 | Rockford et al. |
| 4,917,161 A | 4/1990 | Townend |
| 4,941,485 A | 7/1990 | Perfetti et al. |
| 5,039,423 A | 8/1991 | Kelley |
| 5,372,149 A | 12/1994 | Roth et al. |
| 5,569,833 A | 10/1996 | Vincentz et al. |
| 5,611,360 A | 3/1997 | Tang |
| 5,948,430 A | 9/1999 | Zerbe et al. |
| 5,984,430 A | 11/1999 | Koga et al. |
| 6,083,531 A | 7/2000 | Humbert-Droz et al. |
| 6,095,152 A | 8/2000 | Beven et al. |
| 6,177,096 B1 | 1/2001 | Zerbe et al. |
| 6,311,695 B1 | 11/2001 | Williams |
| 6,564,808 B1 | 5/2003 | Hempfling et al. |
| 6,578,584 B1 | 6/2003 | Beven et al. |
| 6,615,842 B1 | 9/2003 | Cerami et al. |
| 6,668,839 B2 | 12/2003 | Williams |
| 6,709,671 B2 | 3/2004 | Zerbe et al. |
| 6,740,332 B2 | 5/2004 | Zyck et al. |
| 6,755,200 B1 | 6/2004 | Hempfling et al. |
| 6,789,548 B2 | 9/2004 | Bereman |
| 6,790,671 B1 | 9/2004 | Austin et al. |
| 6,792,953 B2 | 9/2004 | Lesser et al. |
| 6,805,134 B2 | 10/2004 | Peele |
| 6,834,654 B2 | 12/2004 | Williams |
| 6,895,974 B2 | 5/2005 | Peele |
| 6,907,887 B2 | 6/2005 | Conkling |
| 7,067,116 B1 | 6/2006 | Bess et al. |
| 7,293,564 B2 | 11/2007 | Perfetti et al. |
| 7,992,575 B2 | 8/2011 | Cui et al. |
| 10,357,055 B2 | 7/2019 | Chipley |
| 2001/0051591 A1 | 12/2001 | Ferrett et al. |
| 2004/0025894 A1 | 2/2004 | Beven et al. |
| 2004/0244521 A1 | 12/2004 | Russ et al. |
| 2005/0034365 A1 | 2/2005 | Li et al. |

(Continued)

FOREIGN PATENT DOCUMENTS

| | | |
|---|---|---|
| GB | 1189880 A | 4/1970 |
| GB | 2 265 297 A | 9/1993 |

(Continued)

OTHER PUBLICATIONS

Anderson et al., "Bactericidal Effect of Sodium Chlorate on *Escherichia coli* O157:H7 and *Salmonella typhimurium* DT104 in Rumen Contents In Vitro," *J. Food Protection*, 63(8), pp. 1038-1042 (Aug. 2000) (Des Moines, Iowa, US).

Anderson et al., "Bactericidal Effect of Sodium Chlorate on *Escherichia coli* Concentrations in Bovine Ruminal and Fecal Contents In Vivo," *Microbial Ecol. Health Dis.*, 14, pp. 24-29 (Jul. 2002) (Electronic Publication).

Anderson et al., "Effect of Sodium Chlorate on *Salmonella typhimurium* Concentrations in the Weaned Pig Gut," *J. Food Protection*, 2001, 64(2), pp. 255-258 (Feb. 2001) (Hoboken, New Jersey, US).

Browne, "The Design of Cigarettes," *Hoechst Celanese Corp.*, pp. 13-19 (1990).

(Continued)

*Primary Examiner* — Michael J Felton
(74) *Attorney, Agent, or Firm* — Arnold & Porter Kaye Scholer LLP; David R. Marsh

(57) ABSTRACT

The present document generally relates to methods and materials involved in producing tobacco or smokeless tobacco product comprising chlorate. For example, chlorate can be used to reduce tobacco specific nitrosamine content in tobacco or smokeless tobacco products.

13 Claims, No Drawings

(56) References Cited

U.S. PATENT DOCUMENTS

| | | |
|---|---|---|
| 2005/0115580 A1 | 6/2005 | Quinter et al. |
| 2005/0121046 A1 | 6/2005 | Hempfling et al. |
| 2005/0244521 A1 | 11/2005 | Strickland et al. |
| 2006/0196516 A1 | 9/2006 | Cui et al. |
| 2007/0149408 A1 | 6/2007 | Thomas et al. |
| 2011/0289836 A1 | 12/2011 | Cui et al. |

FOREIGN PATENT DOCUMENTS

| | | |
|---|---|---|
| WO | WO 2001/035770 A1 | 5/2001 |
| WO | WO 2002/013636 A1 | 2/2002 |
| WO | WO 2004/068973 A2 | 8/2004 |
| WO | WO 2005/041699 A2 | 5/2005 |

OTHER PUBLICATIONS

Bush et al., "Formation of Tobacco-Specific Nitrosamines in Air-Cured Tobacco," *Recent Advances in Tobacco Science*, 27:23-46 (2001).

Callaway et al., "Effects of Sodium Chlorate on Antibiotic Resistance in *Escherichia coli* O157:H7," *Foodborne Pathogens and Disease*, 1, pp. 59-63 (Jul. 2004) (Electronic Publication).

Cooperative Extension Offices of Cornell University, Oregon State University, the University of Idaho, the University of California at Davis, and Michigan State University, "Extension Toxicology Network, Pesticide Information Profiles: Sodium Chlorate", Sep. 1995, Oregon State University, <http://extoxnet.orst.edu/pips/sodiumch.htm>, accessed Sep. 12, 2009, 2 pages.

Cui et al., "Factors in Tobacco-Specific N—Nitrosamine Accumulation in Tobacco," *Tobacco Science Research Conference 50*, Abstr. 74 (1996).

Cui, "The source and the regulation of nitrogen oxide production for tobacco specific nitrosamine formation during air-curing tobacco," Ph.D. dissertation, University of Kentucky, 178 pages (1998).

Davis and Nielson, "Tobacco: Production," *Chemistry and Technology*, Blackwell Publishing, pp. 15-21 (1999).

Determination of Nicotine, pH, and Moisture Content of Six U.S. Commercial Moist Snuff Products—Florida, Jan.-Feb. 1999.

Di Giacomo et al., "Microbial Community Structure and Dynamics of Dark Fire-Cured Tobacco Fermentation," *Applied and Environ. Microbiol.*, 73(3), pp. 825-837 (Feb. 2007) (Washington, DC, US).

Hakk et al., "Tissue Residues, Metabolism, and Excretion of Radiolabeled Sodium Chlorate ($Na^{36C}O_3$) in Rats," *J. Agric. Food Chem.*, 55, pp. 2034-2042 (Feb. 2007) (Washington, DC, US).

HHS Ingredients List, <http://www.forsythtobacco.com/TIcig_ingred_list.asp>, printed Aug. 27, 2007, 32 pgs.

Hoffmann et al., "Chemical Composition and Carcinogenicity of Smokeless Tobacco," *Adv. Dent. Res.*, 11(3), pp. 322-329 (Sep. 1997)(Valhalla, New York, US).

Leffingwell, "Leaf Chemistry," Tobacco: Production, Chemistry and Technology, Davis & Nielsen (eds.), Blackwell Science, Chapter 8, pp. 265-312 (1999).

Lewis, Richard J., Sr. Hawley's Condensed Chemical Dictionary (15th Edition) 2007. (pp. 1028). John Wiley & Sons. Online version available: <http://knovel.com/web/portal/browse/display?_EXT_KNOVEL_DISPLAY_bookid-28-22&VerticalID=0> (2007).

Noss et al., "Disinfecting Capabilities of Oxychlorine Compounds," *Appl. Enviro. Microbiology*, 50(5), pp. 1162-1164 (Nov. 1985)(Hoboken, New Jersey, US).

Peedin, "Production Practices. 5A Flue-cured Tobacco," *Tobacco: Production, Chemistry and Technology*, Davis & Nielsen (eds.), Blackwell Science, Chapter 5, p. 104-182 (1999).

Rusmana et al., "Use of chlorate as a selective inhibitor to distinguish membrane-bound nitrate reductase (Nar) and periplasmic nitrate reductase (Nap) of dissimilative nitrate reducing bacteria in sediment," *FEMS Microbiology Ecology*, 48, pp. 379-386 (Mar. 2004) (Electronic Publication).

Safe Drinking Water Committee, National Research Council; "Drinking Water and Health," 2:14, National Academies Press. (1977) Available online: <http://books.google.com/books?id=oXIrAAAAYAAJ&lpg=PR1#v=onepage&q-&f=false>.

Seed to Smoke, Tobacco: Production, Chemistry and Technology, Davis & Nielsen (eds.), Blackwell Science, pp. 19-20 (1990).

Shepard, Snuff Yesterday and Today, Accessed via Legacy Tobacco Documents Library, {http://legacy[dot]library[dot]ucsf[dot]edu/tid/fhh32f00> (1963) (London, England, UK).

Smokeless Tobacco Fact Sheets, 3rd Int'l Conference on Smokeless Tobacco, Stockholm, Sweden, Sep. 22-25, 2002, 24 pages.

Steel et al., "Bacterial survey of curing tobaccos," $54^{th}$ Tobacco Science Research Conference (2000).

Wahlberg et al., "Smokeless Tobacco" Tobacco Production, Chemistry and Technology, Chapter 14, pp. 452-460 (1999).

Wehlburg, "Cigars and Cigarillos," Tobacco: Production, Chemistry and Technology, Davis & Nielsen (eds.), Blackwell Science, Chapter 13, pp. 440-451 (1999).

Krochta et al., "Edible and biodegradable polymer films: challenges and opportunities," *Food Technology*, 51(2), pp. 61-74 with cover page, (Feb. 1997) (electronic publication).

TOBACCO HAVING REDUCED TOBACCO SPECIFIC NITROSAMINE CONTENT

CROSS-REFERENCE TO RELATED APPLICATIONS

This application is a continuation of U.S. patent application Ser. No. 16/441,717, filed Jun. 14, 2019, which is continuation of U.S. patent application Ser. No. 15/006,205, filed Jan. 26, 2016, (now U.S. Pat. No. 10,357,055, issued Jul. 23, 2019), which is a continuation of U.S. patent application Ser. No. 13/442,280, filed Apr. 9, 2012, (now U.S. Pat. No. 9,271,524, issued Mar. 1, 2016), which claims priority to U.S. patent application Ser. No. 11/852,172, filed Sep. 7, 2007. All the foregoing mentioned applications are hereby incorporated by reference in their entirety.

BACKGROUND OF THE INVENTION

1. Technical Field

The present document is generally directed to compositions related to tobacco and smokeless tobacco products comprising chlorate.

2. Background Information

Tobacco specific nitrosamines (TSNAs) are considered to be undesirable constituents that occur naturally in tobacco. TSNAs are the result of a chemical reaction between tobacco alkaloids, such as nicotine and nornicotine, and unstable $NO_x$ radicals. See, Cui et al. (*Tob. Sci. Res. Conf.* 50, Abstr. 74 (1996)). It is generally understood that microbes on or in the tobacco plant before, during, or after curing are primarily responsible for the formation of nitrite, the predominant $NO_x$ precursor for TSN A formation (Bush et al, *Recent Advances in Tobacco Science.* 27:23-46 (2001)). TSNAs include N'-nitrosonornicotine (NNN), N'-nitrosoanatabine (NAT), N'-nitrosoanabasine (NAB), 4-(N-nitrosomethylamino)-1-(3-pyridyl)-1-butanone (NNK), 4-(N-nitrosomethylamino)-4-(3-pyridyl)-1-butanal (NNA), 4-(N-nitrosomethylamino)-1-(3-pyridyl)-1-butanol (NNAL), 4-(N-nitrosotnethylamino)-4-(3-pyridyl)-1-butanol (iso-NNAL), and 4-(N-nitrosomethylarnino)-4-(3-pyridyl)-butanoic acid (iso-NNAC). Some existing methods for reducing TSNA content in tobacco and tobacco products focus on reducing bacteria or bacterial activity on tobacco. See, for example, U.S. Pat. Nos. 6,311,695 and 6,755,200. Because certain bacteria and bacterial activities are required for tobacco fermentation, such methods are not useful for producing fermented tobacco and tobacco products comprising fermented tobacco. Other methods include using filters to remove TSNAs from cigarette smoke. See, for example, U.S. Pat. Nos. 6,615,842, 6,789,548, and 6,792,953. Since smokeless tobacco products are generally smoked, these methods are not suitable for reducing the TSNA content in smokeless tobacco. Still other methods include using extracts or powders obtained from cured tobacco stems and lamina to produce alternative smokeless tobacco products. See, for example U.S. Pat. Nos. 6,668,839 and 6,834,654. However, such products require flavors, such as eucalyptus, to reduce bitterness, and therefore may not provide acceptable tasting smokeless tobacco product. Other methods involve reducing exposure of tobacco to nitric oxide gas during curing. See, for example, U.S. Pat. Nos. 6,805,134 and 6,895,974. These methods are not applicable to the formation of TSNAs during fermentation or subsequent shelf life. Thus, it is desirable to produce tobacco and smokeless tobacco products having reduced TSN, content, while retaining the flavor, texture, and fragrance.

SUMMARY OF THE INVENTION

Provided herein are compositions related to the production of tobacco and smokeless tobacco products comprising chlorate. The compositions provided herein are based, in part, on the discovery that chlorate can reduce tobacco specific nitrosamine (TSNA) formation during tobacco processing without adversely affecting tobacco flavor, texture, and fragrance, or preventing fermentation.

In one aspect, a smokeless tobacco product comprising fermented tobacco is disclosed. The tobacco product comprises chlorate at a concentration of from about 12 parts per million to about 200 parts per million, e.g., from about 12 parts per million to about 100 parts per million, or from about 50 parts per million to about 150 parts per million, or from about 12 parts per million to about 80 parts per million. The tobacco product can have a moisture content of about 1 percent to about 15 percent, e.g., a dry snuff. In some embodiments, the tobacco product has a moisture content of from about 15 percent to about 60 percent, e.g., from about 40 percent to about 60 percent. Such a tobacco product can be a moist snuff.

In another aspect, fermented tobacco comprising chlorate is disclosed. The chlorate can be present at a concentration of from about 25 parts per million to about 200 parts per million, e.g., from about 40 parts per million to about 200 parts per million, from about 70 parts per million to about 150 parts per million, or from about 40 parts per million to about 80 parts per million.

In another aspect, a smokeless tobacco product comprising chlorate at a concentration of from about 6 parts per million to about 200 parts per million is disclosed: The smokeless tobacco product can contain non-fermented tobacco and chlorate at a concentration of from about 10 parts per million to about 75 parts per million. In some embodiments, the smokeless tobacco product contains fermented tobacco. The tobacco product can be a film strip, or can be coated on a toothpick.

In another aspect, cured, non-fermented tobacco comprising chlorate at a concentration of from about 10 parts per million to about 75 parts per million is disclosed. Such tobacco can have chlorate present at a concentration of from about 20 parts per million to about 50 parts per million.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the detailed description set forth below. Other features, objects, and advantages of the invention will be apparent from the description and from the claims.

DETAILED DESCRIPTION

Compositions related to tobacco and smokeless tobacco products comprising chlorate are provided herein. It has been found that the inclusion of chlorate in tobacco processing can reduce the number of nitrate-reducing bacteria and consequently reduce the amount of nitrite formed, despite the fact that some nitrate-reducing microbes are resistant to chlorate. Generally, bacteria that cannot reduce nitrate are unaffected by chlorate. Thus, the inclusion of chlorate in tobacco processing can selectively inhibit certain nitrate-reducing bacteria while having a minimal effect on bacteria that cannot reduce nitrate. Consequently, the amount of nitrite formed can be reduced and the formation of TSNA during tobacco processing can be reduced without adversely affecting tobacco flavor, texture, and fragrance, or preventing fermentation. In contrast, chlorine compounds such as chlorite and chlorine dioxide are non-selective bacteriocides effective against both nitrate-reducing bacteria and non-nitrate-reducing bacteria; the use of such compounds in tobacco processing can adversely affect flavor, texture and fragrance, and prevent fermentation.

The compositions described herein can have reduced microbe bacteria and/or fungi) numbers, or reduced tobacco specific nitrosamine (TSNA) content. As used herein, "microbe numbers" refers to the number of microbes or microbe colony forming units in tobacco or a tobacco product (e.g., a smokeless tobacco product). Tobacco or smokeless tobacco products comprising chlorate can have reduced microbe numbers relative tobacco or tobacco products that are processed in the same manner, but which do not comprise chlorate. Microbe numbers can be measured using methods known in the art, "Tobacco specific nitrosamine content" refers to the amount of TSNA in tobacco or a tobacco product. Tobacco or smokeless tobacco products comprising chlorate can have reduced TSNA content relative to tobacco or smokeless tobacco products that are processed in the same manner, but which do not comprise chlorate. TSNA content can refer to the amount of a single TSNA, more than one TSNA, or total TSNA content. TSNA content can be measured according to methods known in the art.

Smokeless Tobacco Products

Smokeless tobacco products comprising chlorate are provided herein. Such smokeless tobacco products include, without limitation, moist snuff, dry snuff, chewing tobacco, and edible films. In some cases, a smokeless tobacco product can be coated on, for example, a toothpick. A smokeless tobacco product provided herein can contain fermented tobacco, non-fermented tobacco, or both fermented and non-fermented tobacco. In some cases, a smokeless tobacco product provided herein comprises tobacco that has been pasteurized or treated with steam.

A suitable chlorate concentration can be chosen based on how the tobacco is processed and the type of product in which the tobacco is to be used. The chlorate concentration in tobacco typically is from about 10 parts per million (ppm) to about 500 ppm. With respect to tobacco, the concentration of chlorate in parts per million is measured as the weight of chlorate per weight of tobacco, including water. For example, tobacco comprising chlorate at a concentration of about 50 ppm contains about 50 mg chlorate in 1 kg tobacco. For example, fermented tobacco for use in a smokeless tobacco product having a moisture content of from about 1% to about 15%, such as hard plug chewing tobacco, can comprise chlorate at a concentration of from about 40 ppm to about 200 ppm, e.g., from about 50 ppm to about 150 ppm, from about 80 ppm to about 150 ppm, from about 80 ppm to about 120 ppm, about 85 ppm, about 90 ppm, about 100 ppm, or about 110 ppm. Fermented tobacco for use in dry snuff can comprise chlorate at a concentration of from about 50 ppm to about 150 ppm, e.g., from about 80 ppm to about 150 ppm, from about 70 ppm to about 120 ppm, from about 90 ppm to about 130 ppm, about 90 ppm, about 100 ppm, or about 110 ppm.

In another example, fermented tobacco for use in a smokeless tobacco product having a moisture content of from about 15% to about 60%, such as moist snuff, can comprise chlorate at a concentration of from about 40 ppm to about 80 ppm, e.g., from about 40 ppm to about 70 ppm, from about 45 ppm to about 75 ppm, about 45 ppm, about 50 ppm, about 55 ppm, or about 60 ppm.

Non-fermented tobacco can comprise chlorate at a concentration of from about 10 ppm to about 75 ppm, e.g., from about 10 ppm to about 50 ppm, from about 20 ppm to about 75 ppm, from about 20 ppm to about 50 ppm, about 15 ppm, about 25 ppm, about 50 ppm, or about 70 ppm.

The chlorate concentration in a smokeless tobacco product can be from about 6 ppm to about 500 ppm, measured as the weight of chlorate per weight of product. For example, a smokeless tobacco product can comprise chlorate at a concentration of from about 10 ppm to about 200 ppm, from about 12 ppm to about 150 ppm, from about 10 ppm to about 80 ppm, from about 15 ppm to about 100 ppm, or about 25 ppm to about 200 ppm. The concentration of chlorate in a smokeless tobacco product can vary depending on the percentage of tobacco in the tobacco product, which is typically from about 25% to about 100% tobacco by weight of a smokeless tobacco product. For example, if tobacco constitutes 30% by weight of a smokeless tobacco product produced from tobacco comprising chlorate at a concentration of about 50 ppm, then the tobacco product will comprise chlorate at a concentration of about 15 ppm. In another example, if tobacco constitutes 98% by weight of a tobacco product produced from tobacco comprising chlorate at a concentration of about 200 ppm, then the tobacco product will comprise chlorate at a concentration of about 196 ppm.

Chlorate concentration measurements can vary by about 20% (e.g., about 10%) between replicates of a single sample of tobacco or a smokeless tobacco product. For example, in tobacco or a smokeless tobacco product comprising chlorate at a concentration of about 10 ppm, chlorate concentration measurements can be from about 9 ppm to about 11 ppm. Similarly, in tobacco or a smokeless tobacco product comprising chlorate at a concentration of about 200 ppm, chlorate concentration measurements can be from about 180 ppm to about 220 ppm. Chlorate concentration can be measured using techniques known in the art, such as liquid chromatography (e.g., ion chromatography); radiolabeling, or atomic absorption spectroscopy.

A smokeless tobacco product comprising chlorate can have a moisture content of from about 1% to about 60% by weight, e.g., from about 1% to about 15%, from about 15% to about 60%, or from about 40% to about 60%. For example, moist snuff typically has a moisture content of from about 40% to about 60% by weight, e.g., about 40% to about 55%, about 45% to about 60%, about 48% to about 55%, about 40% to about 53%, or about 45% to about 55%.

Dry snuff typically has a moisture content of from about 6% to about 10% by weight, e.g., about 6% to about 9%, about 7% to about 9%, about 7% to about 10%, about 7%, about 8%, or about 9%.

Hard plug chewing tobacco typically has a moisture content of about 1% to about 15% by weight, e.g., about 5% to about 15%, about 5% to about 10%, about 10% to about 15%, about 6% to about 12%, or about 7% to about 15%.

Soft plug chewing tobacco typically has a moisture content of about 15% to about 35% by weight, e.g., about 15% to about 30%, about 15% to about 20%, about 20% to about 35%, about 20%, about 23%, or about 25%.

Edible films comprising tobacco typically comprise ingredients used in edible films that are known in the art including, without limitation, film forming agents, surfactants, plasticizers, flavoring agents, fillers, colorants, emulsifiers, binding agents, fragrances, lubricants, or preservatives. It will be appreciated that the ingredients can be adjusted to achieve the desired properties of the product. For example, the amount of a plasticizer can be adjusted to modify the brittleness of the product, or a filler can be added to modify the texture of the product Ingredients suitable for edible films are known in the art. See, for example, U.S. Patent Application Publication 2004/0244521, U.S. Pat. Nos. 5,948,430, 6,709,571, 7,067,116, 6,083,531, Krochta et al. (*Food Technology* 51:61-74 (1997)), Glicksman (*Food Hydrocolloids*. CRC (1982)), Krochta (*Edible Coatings and Films to Improve Food Quality*. Technomic. (1994)), and Nussinovich (*Water-Soluble Polymer Applications in Foods*. Blackwell Science. (2003)). Edible films described herein typically comprise tobacco at a concentration of from about 5% to about 90% by weight, e.g., 10% to 60%, 15% to 60%, 20% to 75%, 25% to 75%, 30% to 50%, 35% to 75%, 40% to 75%, 45% to 80%, 50% to 75%, or 50% to 80%. Preferably, the tobacco concentration is about 25%.

Fermented Tobacco

Fermented tobacco comprising chlorate is also provided herein Fermented tobacco can be made by various suitable techniques known in the art. See, e.g., U.S. Pat. Nos. 5,372,149, 4,528,993, 4,660,577, and 4,848,373. In general, tobacco fermentation includes adjusting the moisture content of cured, aged tobacco to a moisture content of from about 20% to about 60%, e.g., from about 20% to about 25%, or from about 40%, to about 60%, and allowing the moistened tobacco to ferment in piles. In some cases, the tobacco piles are contained in open bins. The fermenting tobacco piles are agitated to prevent the internal temperature of the piles from exceeding a certain temperature. In scone cases, the temperature is monitored to determine when the piles should be agitated. Fermentation can be terminated using techniques known in the art, such as drying or cold storage. In some cases, tobacco is steam treated or pasteurized following fermentation.

Tobacco types suitable for fermentation (e.g., air-cured or fire-cured dark tobacco) are known in the art, and can be used individually or blended. Tobacco is typically cut or ground prior to fermentation. In some cases, salt, ash, flavors, glycerin, or other ingredients known in the art can be added to the tobacco prior to, during, or after fermentation, and thus, fermented tobacco can include such ingredients. The fermented tobacco can be adjusted to a moisture content and pH suitable for the intended product using techniques known in the art.

As used herein, fermentation does not refer to tobacco aging, Tobacco aging is typically carried out in a wooden drum a hogshead) or cardboard cartons in compressed conditions for several years (e.g., two to five years), at a moisture content ranging from 10% to about 25%. See, U.S. Pat. Nos. 4,516,590 and 5,372,149.

Chlorate can be applied to cured, aged tobacco prior to or during fermentation. Preferably, chlorate is applied prior to fermentation. Typically, chlorate is applied to cured, aged tobacco in the form of an aqueous solution. For example, chlorate can be added to the aqueous solution that is used to adjust the moisture content of tobacco prior to fermentation. In another example, an aqueous solution comprising chlorate can be added after adjusting the moisture content of the tobacco. Any suitable method, such as mixing or spraying, can be used to apply an aqueous solution comprising chlorate to tobacco. In some cases, chlorate is applied as a solid or powder to tobacco before adjusting the moisture content of cured, aged tobacco, and the chlorate is allowed to dissolve as fermentation is initiated.

Chlorate is applied to tobacco in an amount sufficient to produce tobacco comprising chlorate at a concentration of about 25 ppm to about 500 ppm. The chlorate concentration can be adjusted to a concentration effective to reduce TSNA content in the fermented tobacco; while having minimal effect on the flavor, texture, and fragrance of the fermented tobacco. It will be recognized that the amount of chlorate sufficient to reduce TSNA content in the fermented tobacco can be adjusted for the length and conditions of the fermentation process.

Fermented tobacco can be used in smokeless tobacco product as described herein. In addition, fermented tobacco as described herein can also be used in smoking articles, such as Toscano cigars.

Non-Fermented Tobacco

Non-fermented tobacco comprising chlorate is also provided herein. Chlorate is applied to tobacco prior to, during, or after curing. Chlorate can be applied before or after aging, or during finishing. In some cases, tobacco can be steam treated or pasteurized prior to or after the addition of chlorate.

Green tobacco plants or leaves, partially cured tobacco, or cured tobacco can be treated with chlorate. Uncured tobacco leaf or leaves, as used herein, is meant to include flue-cured, air-cued, and fire-cured tobacco leaves which are green or partially cured. Cured tobacco indicates tobacco leaves which have completed the curing process. Harvesting tobacco is meant to include both priming and stalk-cutting of tobacco. Tobacco leaf or leaves can indicate individual primed leaves or stalk cut leaves of tobacco, or stalk-cut leaves as attached to the tobacco stalk.

Chlorate is applied to tobacco in an amount sufficient to produce non-fermented tobacco comprising chlorate at a concentration of about 10 ppm to about 75 ppm. The chlorate concentration can be adjusted to a concentration effective to reduce microbe numbers, while having minimal effect on the flavor, texture, and fragrance of the tobacco. It will be recognized that the amount and the timing of the application of chlorate sufficient to reduce microbe numbers in tobacco can be adjusted to take into account factors, such as the type of leaf, the curing process being used (e.g., fire-cured, flue-cured, or air-cured), the conditions during curing (temperature and humidity), the length of the curing process, the amount of bacteria and/or fungal growth present, other processing steps steam treatment or pasteurization), and the environmental conditions that affect the curing process.

Chlorate can be applied in dry form or in the form of an aqueous solution to the tobacco leaf, entire plant, or plant part before, during, or after the tobacco is cured. Typically, chlorate is applied in the form of an aqueous solution by spraying the solution onto tobacco or by dipping tobacco in the solution. If applied in dry form, chlorate is typically dissolved following application.

Suitable chlorate salts for use in making the tobacco and smokeless tobacco products provided herein include, without limitation, ammonium chlorate, sodium chlorate, calcium chlorate, potassium chlorate, or combinations thereof. Other suitable chlorate salts include those that are generally recognized as safe by the United States Food and Drug Administration.

Articles of Manufacture

Tobacco or smokeless tobacco products comprising chlorate as provided herein can be packaged in packaging material by means known in the art to form an article of manufacture. Packaging materials, such as plastic, metal, and fiberboard, are well known in the art. Such an article of manufacture typically has a package label accompanying the package, e.g., a tag or label secured to the packaging material, a label printed on the packaging material or a label inserted within the packaging material. The package label may indicate that the tobacco or smokeless tobacco product comprises chlorate.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. Fermented tobacco comprising from 12 parts per million (ppm) to 500 ppm chlorate.

2. The fermented tobacco of claim 1, wherein the chlorate is at a concentration from 12 ppm to 100 ppm.

3. The fermented tobacco of claim 1, wherein the chlorate is at a concentration from 40 ppm to 80 ppm.

4. The fermented tobacco of claim 1, wherein the chlorate is at a concentration from 70 ppm to 250 ppm.

5. The fermented tobacco of claim 1, wherein the fermented tobacco further comprises an ingredient selected from the group consisting of salt, ash, flavor, and glycerin.

6. The fermented tobacco of claim 1, wherein the fermented tobacco comprises air-cured tobacco.

7. The fermented tobacco of claim 1, wherein the fermented tobacco comprises fire-cured dark tobacco.

8. The fermented tobacco of claim 1, wherein the fermented tobacco comprises a moisture content from 1 percent to 15 percent.

9. The fermented tobacco of claim 1, wherein the fermented tobacco comprises a moisture content from 15 percent to 60 percent.

10. The fermented tobacco of claim 1, wherein the fermented tobacco comprises a moisture content from 40 percent to 60 percent.

11. A smokeless tobacco product comprising fermented tobacco comprising from 12 parts per million (ppm) to 500 ppm chlorate, wherein the smokeless tobacco product is selected from the group consisting of moist snuff, dry snuff, chewing tobacco, and an edible film.

12. The smokeless tobacco product of claim 11, wherein the chewing tobacco is selected from the group consisting of hard plug chewing tobacco and soft plug chewing tobacco.

13. The smokeless tobacco product of claim 11, wherein the edible film comprises an ingredient selected from the group consisting of a film-forming agent, a surfactant, a plasticizer, a flavoring agent, a filler, a colorant, an emulsifier, a binding agent, a fragrance, a lubricant, and a preservative.

* * * * *